United States Patent
Watanabe et al.

(10) Patent No.: US 9,081,751 B2
(45) Date of Patent: Jul. 14, 2015

(54) VIDEO SERVER AND REBUILD PROCESSING CONTROL METHOD

(71) Applicant: Kabushiki Kaisha Toshiba, Tokyo (JP)

(72) Inventors: Hiroyuki Watanabe, Tokyo (JP); Toshiki Mori, Tokyo (JP); Naoko Satoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 33 days.

(21) Appl. No.: 13/752,642

(22) Filed: Jan. 29, 2013

(65) Prior Publication Data
US 2013/0238928 A1    Sep. 12, 2013

(30) Foreign Application Priority Data
Mar. 8, 2012 (JP) .................................. 2012-052155

(51) Int. Cl.
G06F 11/00 (2006.01)
G06F 11/20 (2006.01)
G06F 11/10 (2006.01)

(52) U.S. Cl.
CPC ........ G06F 11/2053 (2013.01); G06F 11/1092 (2013.01); *G06F 2211/1016* (2013.01)

(58) Field of Classification Search
CPC ............ G06F 11/1076; G06F 11/1084; G06F 11/1088; G06F 11/1092

USPC ................ 714/6.2, 6.21, 6.22, 6.24; 711/114
See application file for complete search history.

(56) References Cited

U.S. PATENT DOCUMENTS

| | | | | |
|---|---|---|---|---|
| 6,892,275 | B2 * | 5/2005 | Bolt et al. ..................... | 711/114 |
| 7,809,979 | B2 * | 10/2010 | Mochizuki et al. ........ | 714/38.14 |
| 2007/0180214 | A1 * | 8/2007 | Radhakrishnan et al. .... | 711/202 |
| 2007/0180292 | A1 * | 8/2007 | Bhugra .............................. | 714/6 |
| 2008/0250269 | A1 * | 10/2008 | Cherian et al. .................... | 714/6 |
| 2009/0044043 | A1 * | 2/2009 | Cherian et al. .................... | 714/6 |
| 2009/0327801 | A1 * | 12/2009 | Maeda et al. ..................... | 714/6 |
| 2013/0024723 | A1 * | 1/2013 | Govindasamy .............. | 714/6.22 |

FOREIGN PATENT DOCUMENTS

JP    2007-122477    5/2007

* cited by examiner

*Primary Examiner* — Joseph Kudirka
(74) *Attorney, Agent, or Firm* — Patterson & Sheridan, LLP

(57) ABSTRACT

A video server has a table generator, a rebuild processor, and a rebuild controller. The table generator generates a management table of content data ID that specifies the content data and the write location of the content data in the storage unit where the content data are recorded. When a problem takes place in at least one of the storage devices, the rebuild processor executes a rebuild process to recover the content data of the troubled storage device. When a rebuild start request is generated by the rebuild processor, the rebuild controller controls the start and stop of the rebuild process by referring to the management table.

14 Claims, 11 Drawing Sheets

VIDEO SERVER AND REBUILD
PROCESSING CONTROL METHOD

CROSS-REFERENCE TO RELATED APPLICATION

This application is based upon and claims the benefit of priority from Japanese Patent Application No. 2012-052155, filed Mar. 8, 2012; the entire contents of which are incorporated herein by reference.

FIELD

Embodiments described herein relate to a video server that carries out processing of broadcasting programs in a broadcasting station, and a rebuild processing control method carried out by this video server.

BACKGROUND

It is well known that in a broadcasting program output system, content data (the broadcasting programs) are stored beforehand in a video server, and then, under instruction from an automatic program output controller (APC), the content data are reproduced and sent on-air as required. With such on-air processing, typically an operation is carried out to check that the content data is in the proper order before broadcasting is carried out.

However, the image quality of the broadcasting has been improving drastically from high vision to full high vision (2K×1K), ultrahigh vision (4K×2K), and super high vision (8K×4K); and hence the size of the content data that are broadcast has been increasing dramatically. As the size of the content data has increased significantly, multi-channel broadcasting has been adopted for terrestrial broadcasting to BS (broadcasting satellite) broadcasting, and then CS (communication satellite) broadcasting. Consequently, the video server for handling the content data should have high capacity and should be adaptable to a multi-channel system.

Currently, such video servers are designed as a dual system to improve reliability by providing a backup for handling troubles during output (playback). However, when the video server implements a dual system design, its cost rises drastically. Consequently, smaller broadcasters such as local stations, local cable television stations, etc. face difficulty affording the dual system video recording/playback devices.

The content data managed by the video server are critical in program/CM broadcasting and error correction may be required. By incorporating a Reed-Solomon encoding/decoding function in the video server, it is possible to save the content data even when errors occur in a portion of the content data. But, with just the Reed-Solomon encoding/decoding function, a save or recovery may not be possible when trouble occurs with several storage units or at several locations storing the content data. Consequently, people have adopted a scheme whereby a RAID (redundant array of inexpensive disk) system is incorporated in the video server to guarantee the content data by using rebuild processing in the RAID system.

When there is an abnormality in a storage unit in the video server, this storage unit is exchanged and rebuild processing using the RAID function is carried out. If the rebuild subject is being recorded in the storage unit when the rebuild starts, the rebuild operation actually cannot be started. Consequently, when recording operations are being carried out continuously, a rebuild cannot be started, so it may take a long time until completion of the rebuild.

In addition, because the rebuild may take a long time, when a problem takes place in another storage unit, problems may occur in several storage units, and it may become impossible to read the content data. Since a read cannot be carried out, the rebuild cannot be performed, and thus the content data stored on the video server cannot be saved/recovered and may be lost.

DETAILED DESCRIPTION

In general, example embodiments of the present disclosure will be explained with reference to figures.

According to the present disclosure, there is provided a video server and a rebuild control method that allows rebuild processing to be carried out without affecting the recording of the content data in a storage unit being rebuilt.

According to an embodiment of the present disclosure, the video server works as follows: in a recording unit, the content data for on-air broadcasting are recorded in a storage unit having a redundant RAID (redundant array of inexpensive disk) of n+1 storage devices (where n is an integer); and a stream output unit (playback unit) plays back the content data recorded in the storage unit. The storage unit has a table generator, a rebuild processing module, and a rebuild control module.

The table generator generates a management table that catalogs content data ID that identifies the content data by a write location in the storage unit in which the content data are recorded.

The rebuild processing module executes the rebuild processing as follows: when trouble takes place in at least one of the n+1 storage devices, the content data of the storage devices other than the troubled storage device(s) are read out, and these read out data are written in the n+1 storage devices to recover the content data of the troubled storage device.

The rebuild control module controls the rebuild as follows: when a rebuild start request is generated by the rebuild processing module, the management table is taken as a reference, and for each of the content data, the rebuild processing module executes the rebuild processing according to the management table.

First Embodiment

Figure 1:
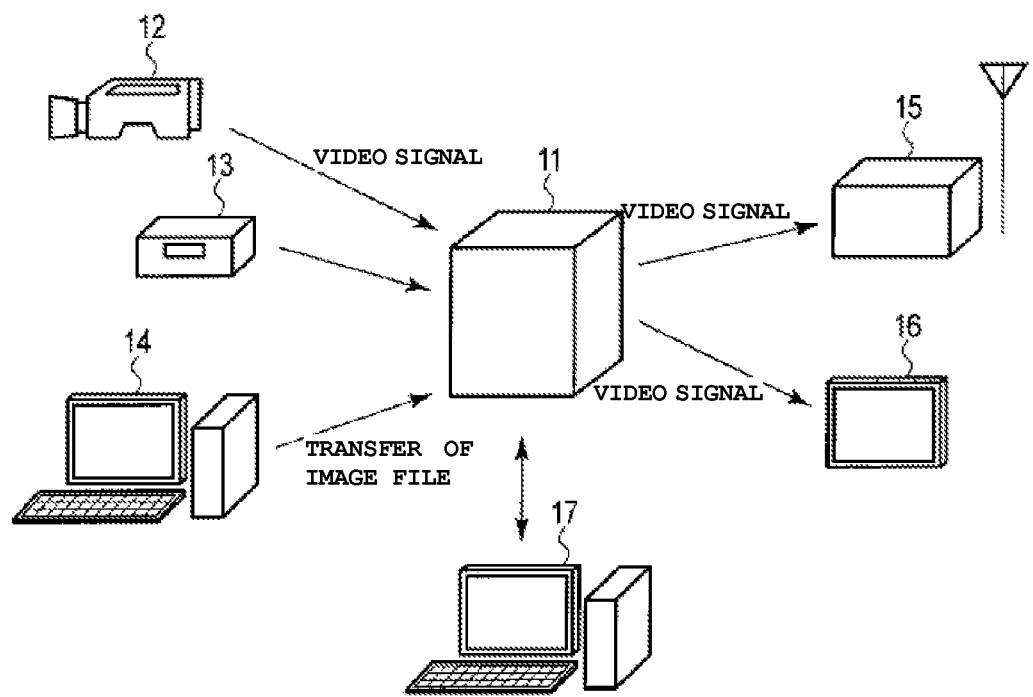
FIG. 1 is a block diagram illustrating the components of the broadcasting program output system in a first embodiment.

FIG. 1 is a block diagram illustrating the components of the broadcasting program output system in an example first embodiment of the present disclosure. In FIG. 1, the content data for the on-air broadcasting program (video data) is supplied by a camera 12, a playback deck 13, and a nonlinear editing unit 14. Video data may be supplied by any or all of these components or similar video data supply components. The video data are selectively reproduced by video server 11 corresponding to the on-air instruction. The output (playback) data are decoded to the video signal in the video server 11, and the decoded signal is sent to a broadcasting equipment 15 for output. The video signal reproduced from the video server 11 may be sent to a monitor 16 in addition to or instead of the broadcasting equipment 15. The video server 11 carries out control on write/read of the video data according to the operation input instructions from the operation terminal 17.

Figure 2:
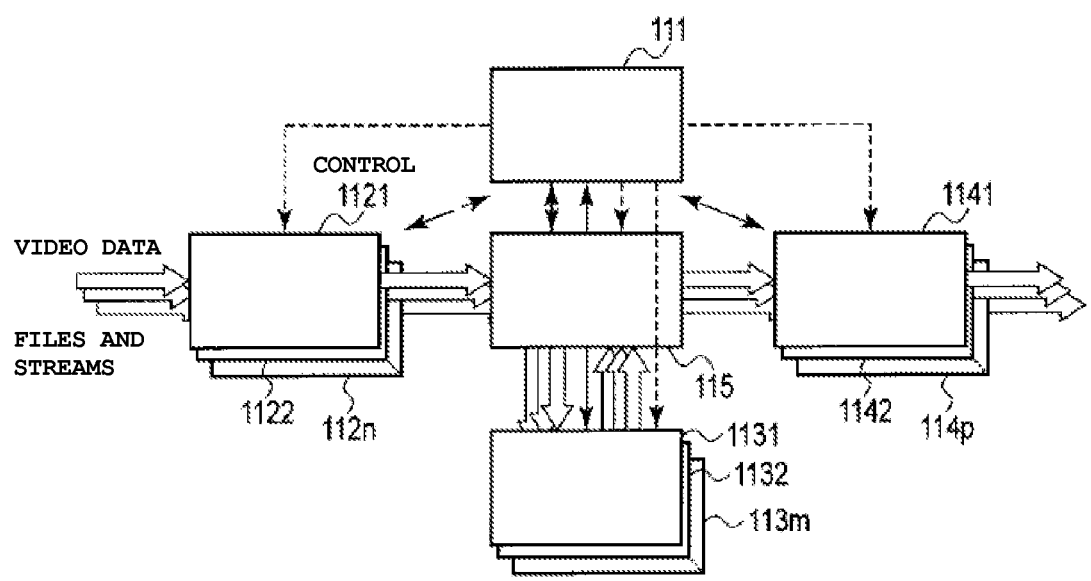
FIG. 2 is a block diagram illustrating the components of the video server in the first embodiment.

FIG. 2 is a circuit block diagram illustrating the components of the video server 11 in the first embodiment. Here, the video server 11 has a controller 111, recording units 1121-112n, storage units 1131-113m, stream output units 1141-114p, and transmitter 115. Here, the controller 111 carries out overall control of the device. The recording units 1121-112n execute the recording processing by encoding the video signals sent from the camera, the video deck, etc. The storage units 1131-113m carry out write/read processing to/from a flash memory or other recording medium for recording the video data stored in the recording units 1121-112n. The stream output units 1141-114p execute the playback processing by decoding the video data read from the storage units 1131-113m to video signals and outputting the video signals. The transmitter 115 uses an asynchronous bus that can transfer the video data at a high speed. Also, the transmitter 115 executes the processing for switching between the input channel that connects the storage units 1131-113m and the output channel that connects the stream output units 1141-114p.

In a video recording operation, the controller 111 instructs the recording units 1121-112n to fetch the video data. Upon receiving the instruction, the recording units 1121-112n execute encoding processing of the incoming video data to MPEG2 or the like. At the same time as this instruction is sent to the recording units 1121-112n, the controller 111 also sends instructions to storage units 1131-113m for the write of the video data. Based on these instructions, the storage units 1131-113m execute the write processing of the video data to the recording medium. In output (playback) operation, the controller 111 sends instructions to storage units 1131-113m for the read of the stored video data. At the same time as this instruction is sent to the storage units 1131-113m, the controller 111 also sends instruction to the stream output units 1141-114p for decoding of the video data. Upon receiving the instruction, the stream output units 1141-114p decode the encoded video data of MPEG2 (or the like) to the video signal and output the video signal.

In the transmitter 115, the video data from the several recording units 1121-112n and the video data from the storage units 1131-113m are concentrated at the transmitter 115 and collision between data packets may take place. As a result, packet discarding and temporary delays can occur.

Figure 3:
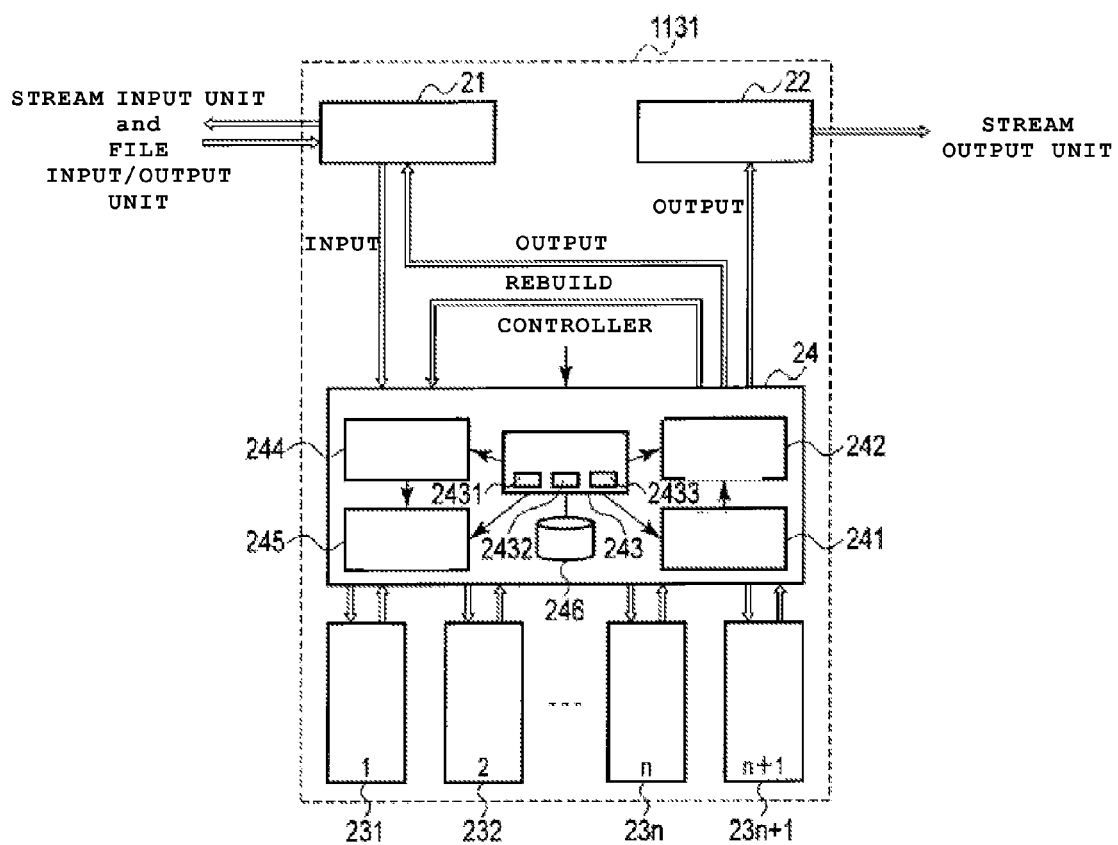
FIG. 3 is a block diagram illustrating the components of the storage unit shown in FIG. 2.

FIG. 3 is a block diagram illustrating the components of the storage units 1131-113m. As an example, the typical case of storage unit 1131 will be explained.

Here, the storage unit 1131 has data transfer processing units 21, 22, storage devices (storages) 231-23(n+1), and RAID controller 24.

The data transfer processing unit 21 carries out transfer processing for the content data between the recording units 1121-112n. The data transfer processing unit 22 carries out transfer processing for the content data between the stream output units 1141-114p.

The content data transferred from the recording units 1121-112n are written in the various storages 231-23(n+1).

The RAID controller 24 carries out overall control/management of the various storages 231-23(n+1).

Also, the RAID controller 24 reads the content data written in the storages 231-23(n+1) and transfers the data via the data transfer processing unit 22 to the stream output units 1141-114p during output operations. The RAID controller 24 reads the content data corresponding to the read controller 241 from the storage 232 and, using parity information checks the appropriateness (correctness) of the content data read by the data recovering unit 242. The management/control unit 243 manages and controls the resources adopted in the read accu-troller 241 and data recovering unit 242.

In addition, in the recording (input) mode, the RAID controller 24 controls so that the content data are received by the data transfer processing unit 21, and the content data are written in the storages 231-23(n+1). The RAID controller 24 controls so that the parity information is added by a parity adding unit 244 and the content data are written from the write controller 245 to the storages 231-23(n+1). The management/control unit 243 manages and controls the resources adopted by the parity adding unit 244 and the write controller 245.

According to the first embodiment of the present disclosure, the management/control unit 243 has a management table generating unit 2431, a rebuild processing unit 2432, and a rebuild controller 2433. The management table generating unit 2431 generates a management table T1 indicating the corresponding relationship between the content data identities (content data ID) and the write locations (memory addresses) in the storages 231-23(n+1) where the content data are recorded. The management table generating unit 2431 also stores the generated management table T1 in an accumulating unit 246.

When trouble takes place in at least one of the storages 231-23(n+1), for example storage 232, the rebuild processing unit 2432 reads out the content data of the storages 231, 233-23(n+1) and has the read out data written in the storages 231-23(n+1) as a rebuild processing for recovering the content data stored in the troubled storage 232.

Upon receiving the request for start of the rebuild processing from the controller 111, the rebuild controller 2433 works as follows: on the basis of the instruction from the management/control unit 243, the management table T1 of the accumulating unit 246 is taken as a reference, and the content data are recovered from the content data and parity information stored in storages 231-23(n+1). The recovered content data are returned to the parity adding unit 244 that adds the parity to the content data again. The rebuild state of the content data is managed and controlled by the management/control unit 243.

Figure 4:
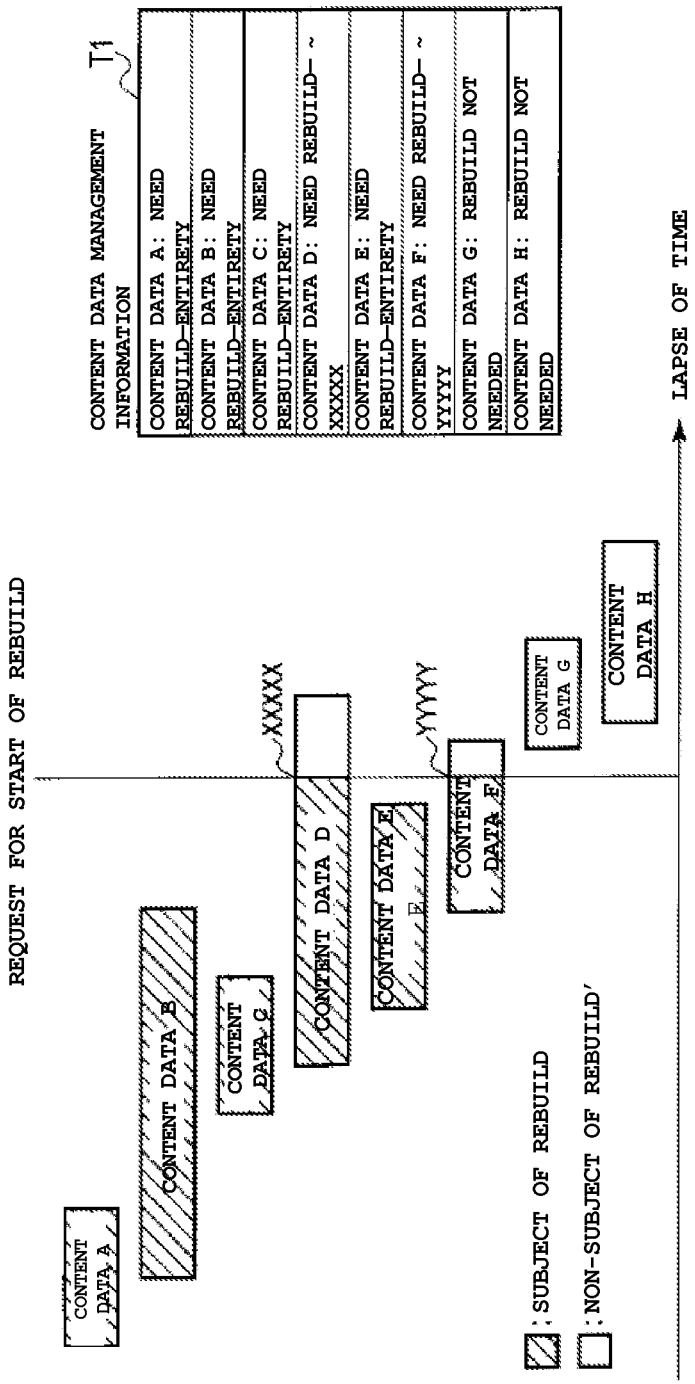
FIG. 4 is a timing diagram illustrating the rebuild control operation in the first embodiment.

In the following, the operation of this first example will be explained. FIG. 4 is a timing diagram illustrating the rebuild control operation performed by the storage unit 1131.

When it is requested to start rebuild, the management/control unit 243 takes the management table T1 of the accumulating unit 246 as a reference, and manages the content data that have already been fully recorded (content data A, B, C, E) as the content data needed for rebuild. The content data still in the recording process (content data D, F) are also taken as the content data needed for the rebuild processing (content data D are XXXXX, content data F are YYYYY) and are managed by the management/control unit 243 of the RAID controller 24.

Also, the management/control unit 243 manages the content data which start recording after the request for start of rebuild is received (content data G, H) as the content data which do not require rebuild processing. The management/control unit 243 has the content data G and H written in the various storages 231, 233-23(*n*+1), excluding the troubled storage 232.

Upon receiving the request for start of rebuild, the RAID controller 24 has the content data written in the (n+1) storages 231-23(*n*+1) including the storage 232 as the rebuild processing subject. Upon receiving the request to start a build of the content data stored in storage 232, the content data in the process of being recorded can be included in the rebuild, and, the content data are written in the storage 232 as the rebuild subject. The rebuild processing is carried out in content data units (such as by broadcasting program), and it is possible to start a rebuild of some content data units without being influenced by the recording state of the video server.

As described above according to the first embodiment, when the content data are recorded, the management/control unit 243 of the RAID controller 24 manages and controls to ensure the optimum rebuild processing is carried out for the content data, as the management table T1 is generated and stored in the accumulating unit 246. Upon receiving the request for start of rebuild from the controller 111, the management table T1 is taken as reference, and, on the basis of the reference result, the rebuild processing is executed for the content data that have been input (recorded) or are in the input (recording) operation, and the rebuild processing is not conducted for the content data that have not yet, at the time of the rebuild request, been stored in the storages 231-23(*n*+1).

Consequently, when recovery is carried out for the content data using the RAID function for rebuild and the management table T1, it is possible to start the rebuild without influencing the recording of the storage unit 1131. As a result, it is possible to shorten the time until completion of the rebuild without any unnecessary time in the rebuild processing. As a result, compared with the method whereby rebuild is executed after waiting for input (recording) to complete, it is possible to decrease the risk of a problem taking place in another storage unit during the rebuild processing or while waiting for start of the rebuild processing, and, hence, the risk of failure to save/recover the content data.

In the first embodiment, the management/control unit 243 of the RAID controller 24 can carry out the optimum rebuild processing corresponding to the specific recording state as follows: the management table T1 is taken as a reference, and rebuild processing is carried out for all of the content data (A-C, E) that have been fully recorded before start of rebuild; for the content data D in the process of recording at the time of the rebuild request, a rebuild processing is carried out from the first(initial) write location to the write location at the time of the rebuild request (memory address XXXX); and for the content data F, the rebuild processing is carried out from the first write location to the write location being recorded a the time of the rebuild request (memory address YYYY). Rebuild processing is not required for content data G and H.

Second Embodiment

According to the second embodiment of the present disclosure, for the content data that are being recorded at the start of rebuild, the rebuild processing is executed according to the order of completion of the recording (first to complete is first to rebuild, independent of the respective order of recording start times).

Figure 5:
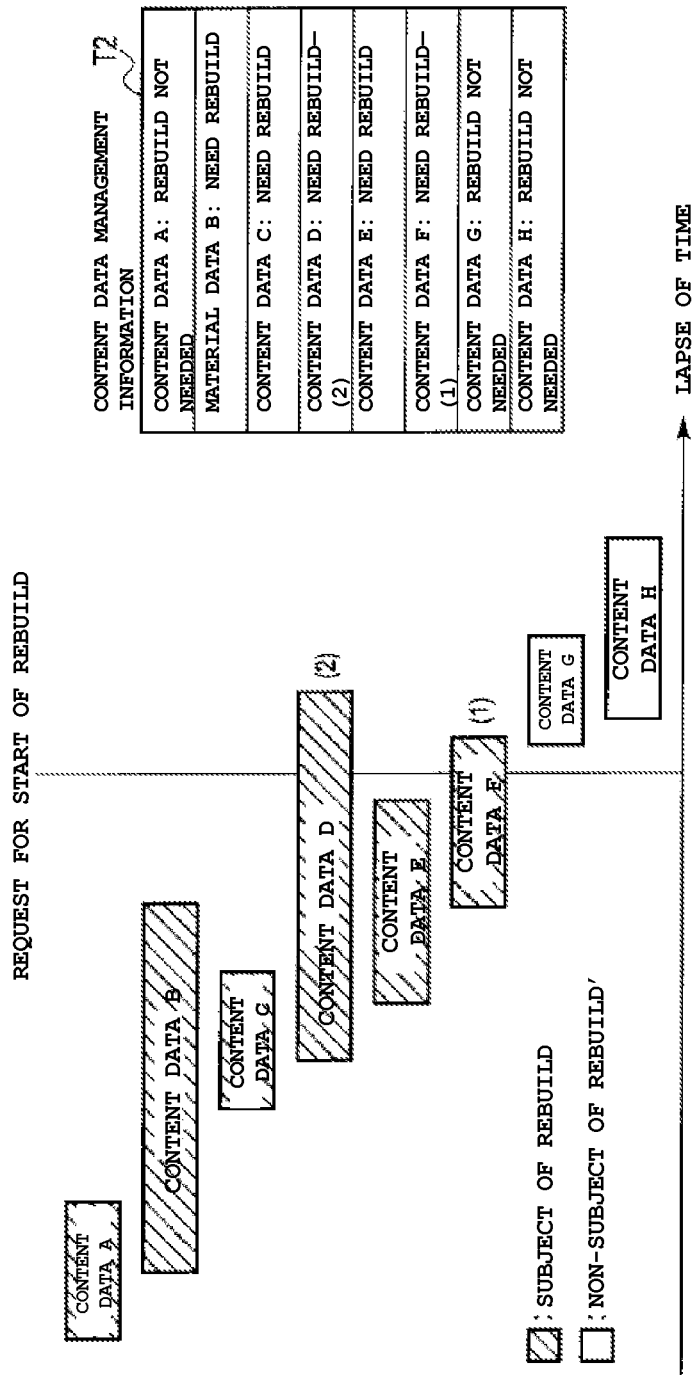
FIG. 5 is a timing diagram illustrating the rebuild control operation in a second embodiment.

FIG. 5 is a timing diagram illustrating the rebuild control operation by storage unit 1131 in the second embodiment.

Upon receiving a request for start of rebuild, the management/control unit 243 of the RAID controller 24 manages the content data that have been recorded to that time point (content data A, B, C, E) and the content data being recorded (content data D, F) as the content data that need the rebuild processing. Also, the management/control unit 243 manages the content data that have been started for recording after the request for start of rebuild (content data G, H) as the content data that do not need rebuild processing.

For the content data still being recorded, the management/control unit 243 does not write the content data in the specific rebuild processing subject, such as storage 233, until completion of the recording of the content data but otherwise ignores, for the time being, the request for start of rebuild for these content data. Upon receiving the request for start of rebuild, the management/control unit 243 takes the management table T2 of the accumulating unit 246 as a reference, and carries out the rebuild processing first for the content data that have already been fully recorded, and then, for the content data still being recorded, it carries out a rebuild processing in order according to the end time of recording of the content data (from content data F to content data D).

It is possible to carry out the rebuild processing in the content data units and to start the rebuild without being influenced by the recording state.

According to the second embodiment as explained above, upon receiving the request for start of rebuild, the RAID controller 24 can use the management table T2 in carrying out the rebuild processing for the content data still being input (D, F) according to the order of the input (recording) completion (from F to D). As a result, even when there is a request for start of rebuild while a lot of the content data is being recorded, it is still possible to complete the rebuild processing in a relatively short time.

Third Embodiment

In the third embodiment, when trouble takes place in the storage device of at least one storage unit among several storage units and the troubled storage device is cut off, it must be determined whether the affected storage device is currently recording content data. If it is currently recording, the content data being written to the affected storage device will be recorded in the storage device of another storage unit.

Figure 6:
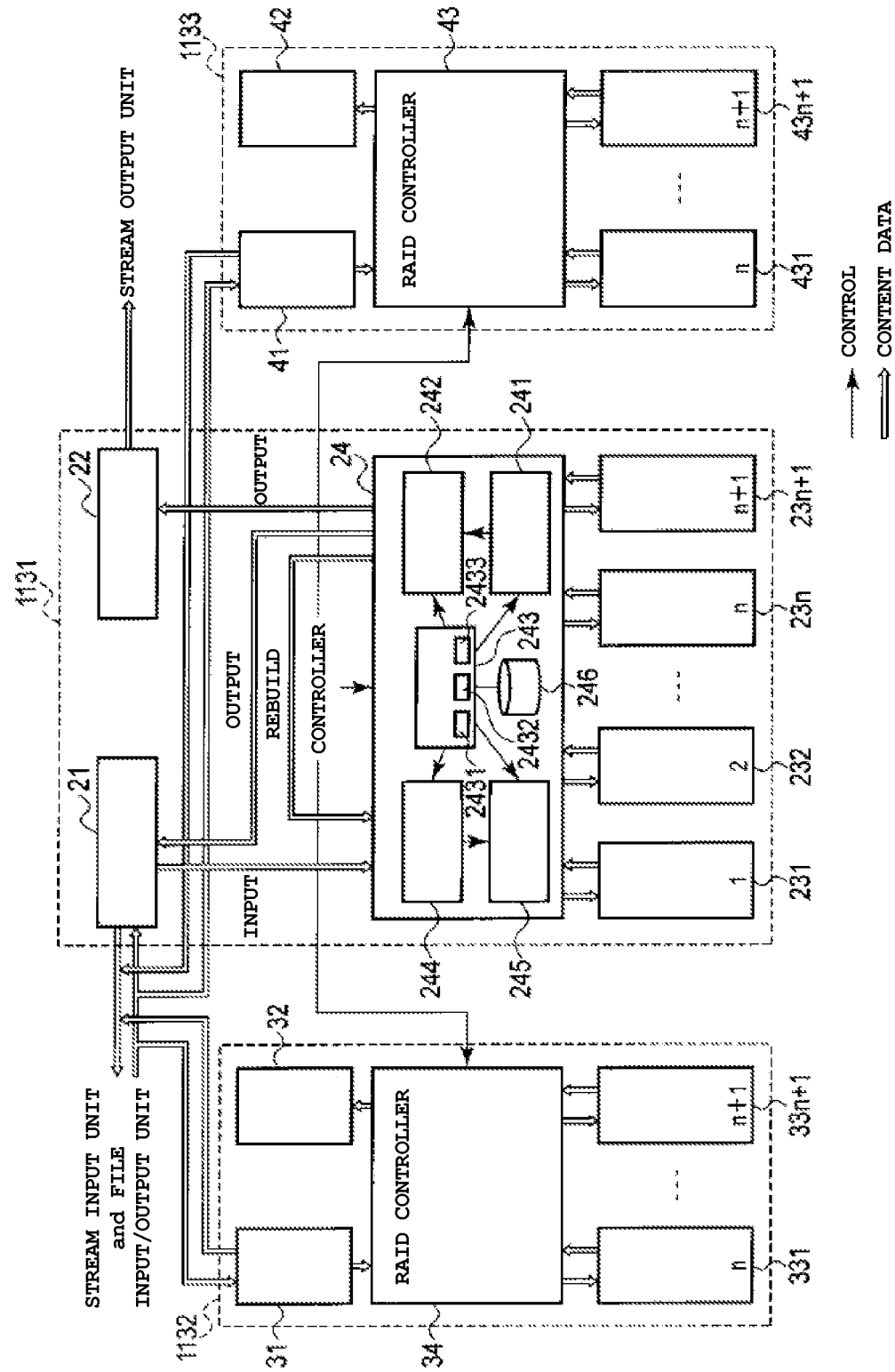
FIG. 6 is a block diagram illustrating the components of plural storage units in a third embodiment.

FIG. 6 is a block diagram illustrating the components of the storage units 1131-113*m* in the third embodiment. In the following, explanations will be given on storage units 1131, 1132, 1133 as an example. The same keys as those in FIG. 3 are adopted here in FIG. 6, and they will not be explained in detail again. In addition, data transfer units 31, 32 in the storage unit 1132 and data transfer units 41, 42 in the storage unit 1133 perform the same functions for their respective storage units as the data transfer processing units 21, 22 perform for the storage unit 1131. Also, the raid controllers 34, 43 perform the same functions for their respective storage units as the raid controller 24 performs for the storage unit 1131.

In the case when trouble develops in the storage device 234, on the basis of the information from the storage devices 231-23(*n*+1), the storage unit 1131 sends the information from the management/control unit 243 to the controller 111. On the basis of the resource state of the video server 11, the controller 111 controls another storage unit 1132 to start recording the content data currently in the process of being recorded in storage unit 1131.

Figure 7:
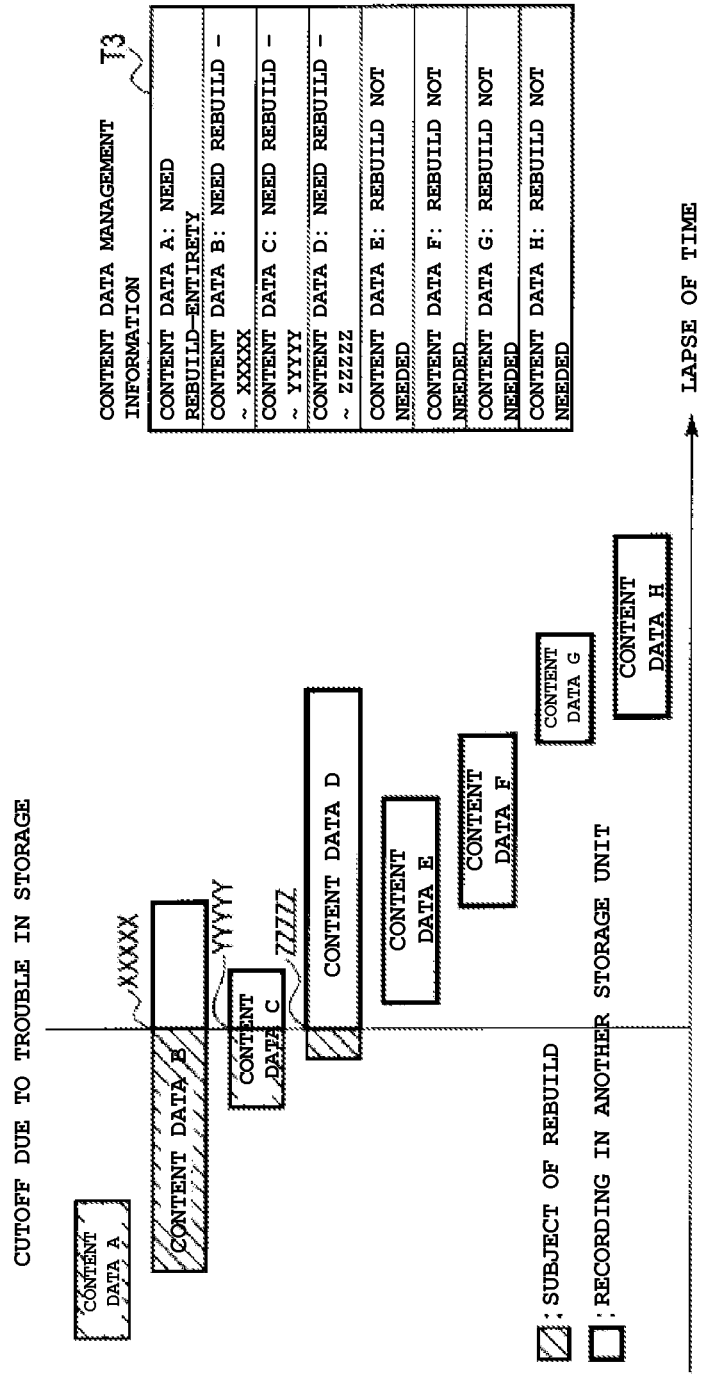
FIG. 7 is a timing diagram illustrating the rebuild control operation in the third embodiment.
Figure 8:
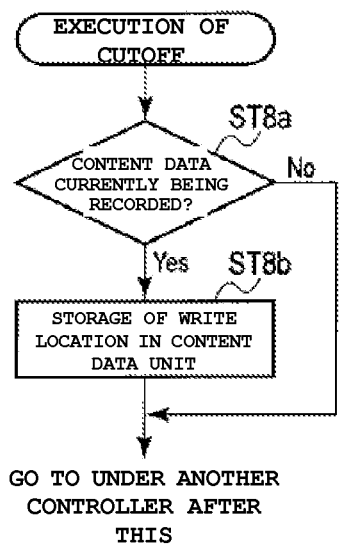
FIG. 8 is a flow chart illustrating the control sequence of a RAID controller when storage cutoff is executed in the third embodiment.

FIG. 7 is a timing diagram illustrating the rebuild control operation by the storage unit 1131. FIG. 8 is a flow chart illustrating the control procedure of the RAID controller 24 when a storage device is cut off.

When a problem takes place in the storage device 234 and the storage device 234 is cut off, the RAID controller 24 takes the management table T3 of accumulating unit 246 as a reference, and manages the content data that have already been fully recorded to that time point (content data A) as the content data that needs the rebuild processing.

The management/control unit 243 of the RAID controller 24 determines whether the content data are the content data currently being recorded (FIG. 8, step ST8a). Here, if content data is being recorded (YES), (as for content data B, C, D), the management/control unit 243 of the RAID controller 24 has the information about the storage progress (the write locations in the storages 231-23($n$+1) (XXXXX for content data B, YYYYY for content data C, and ZZZZZ for content data D)) stored in the management table T3 for management of the content data that requires rebuild processing (step ST8b).

On the other hand, if there is no content data currently being recorded (NO), the management/control unit 243 of the RAID controller 24 notifies the controller 111 about the end of the rebuild processing. Controller 111 controls so that resources are allotted from storage unit 1131 with the troubled storage device 234 to another storage unit 1132, and associated control of the recording unit 1121 is carried out to write the content data in the storage device of another storage unit 1132.

Figure 9:
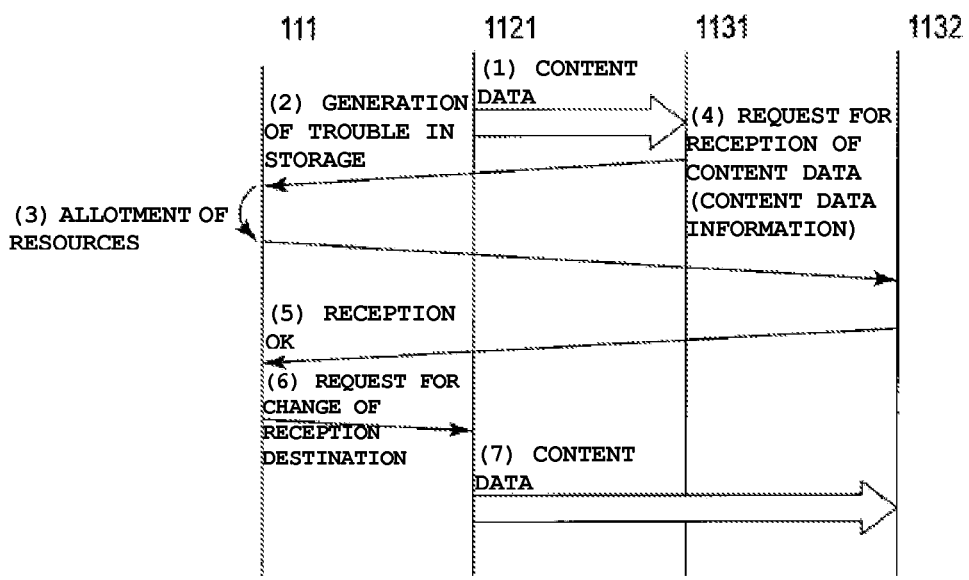
FIG. 9 is a diagram illustrating the sequence of operations carried out in the storage unit when trouble is encountered in the storage unit.

FIG. 9 is a diagram illustrating the associated control of the recording unit 1121 as the resources are allotted from the storage unit with the problem taking place in the storage to another storage unit.

If the recording unit 1121 is in a state in which the content data are transferred to the storage unit 1131 and recorded there (FIG. 9(1)), then, as an abnormality is detected in the storage unit 1131, the storage unit 1131 notifies the controller 111 about this trouble (FIG. 9(2)). Then, the controller 111 carries out the allotment of resources (FIG. 9(3)) and the content data reception request, including the information of the content data, is sent to the storage units 1132-113m (FIG. 9(4)).

When storage unit 1132 is able to receive new content data, the storage unit 1132 returns reception OK to the controller 111 (FIG. 9(5)). Upon receiving this result, the controller 111 sends a request for change of reception destination to the recording unit 1121 (FIG. 9(6)). Then, the recording unit 1121 transfers the content data to the storage unit 1132 (FIG. 9(7)).

According to the third embodiment, when the troubled storage device 234 cannot be recovered by the rebuild processing, and should be cut off, the RAID controller 24 is used to determine whether it is currently recording data. If YES (content data are currently being recorded), the recorded content data are recorded in another storage unit 1132 after cutoff of the storage device 234 is carried out. As a result, even when the content data currently being recorded are cut in the middle due to cutoff of the storage 234, the remaining incoming content data can be recorded in another storage unit 1132 and be protected, thusly. There is no need to re-record and amend the content data that was in the process of being recorded at the time of storage device cutoff from the beginning.

Fourth Embodiment

According to the fourth embodiment, the content data with a request for recording from rebuild start, are returned for recording to the storage of the storage unit being rebuilt.

Figure 10:
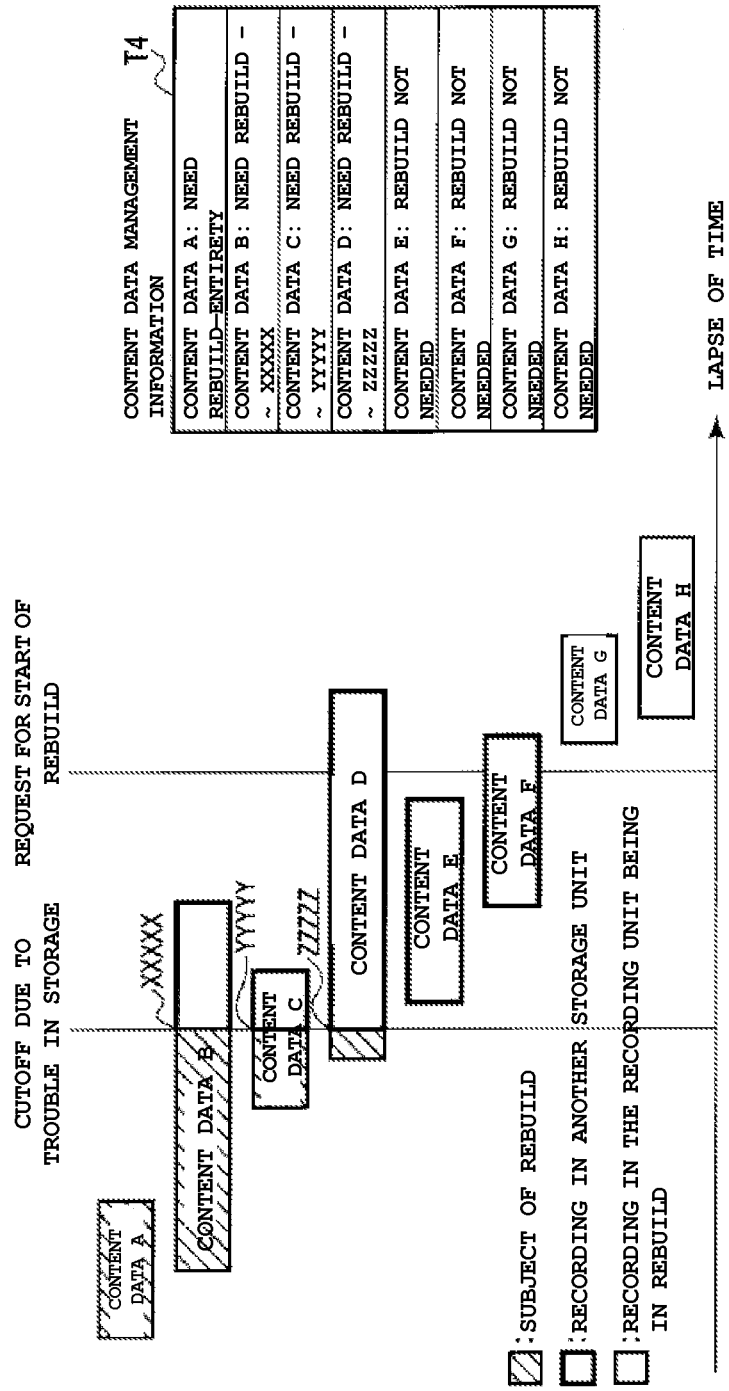
FIG. 10 is a timing diagram illustrating the rebuild control operation in a fourth embodiment.

FIG. 10 is a timing diagram illustrating the rebuild control operation by the storage unit 1131 in the fourth embodiment.

When a problem takes place in the storage device and the storage device is cut off, the management/control unit 243 of the RAID controller 24 takes the management table T4 of the accumulating unit 246 as a reference and manages the content data that have been fully recorded to that point in time (content data A) as the content data that need a rebuild. Also, the management/control unit 243 of the RAID controller 24 takes the content data that is in the process of being recorded at the time of device cutoff(content data B, C, D) as the content data that need rebuild processing, and manages the information up to the corresponding write locations in the storages 231-23 ($n$+1) (XXXXX for the content data B, YYYYY for the content data C, and ZZZZZ for the content data D) in the management table T4.

Also, the controller 111 allots resources from storage unit 1131 with the troubled storage device 234 to another storage unit 1132, and it carries out associated control for the recording unit 1121 to write the content data to the storage of another storage unit 1132.

On the other hand, the management/control unit 243 of the RAID controller 24 writes the content data in the rebuild subject storage device 234 for the content data that started recording after the rebuild request (content data G, H).

According to the fourth embodiment, when it is determined by the controller 111 that the rebuild subject storage device 234 can be recovered by the rebuild processing, the content data requested for recording after start of rebuild (G, H) can be recorded in the storage unit 1131 of the rebuild subject, so that when the content data (G, H) requested for recording are associated with the content data that have been recorded before cutoff (content data A), it is possible to collect the content data for recording in a single storage unit 1131.

According to the fourth embodiment, it is possible to return the content data (G, H), which began recording after the start of rebuild, to the storages 231-23($n$+1) of the storage unit 1131. For the content data (D, E, F) that was being recorded to the storage unit 1131 when the request for rebuild was received, they can be protected while their continuity information is held in another storage unit 1132, and thus it is possible to improve the reliability of the content data recording.

Fifth Embodiment

According to the fifth embodiment, the content data recorded after the start of rebuild are returned for recording in the storage unit being rebuilt.

Figure 11:
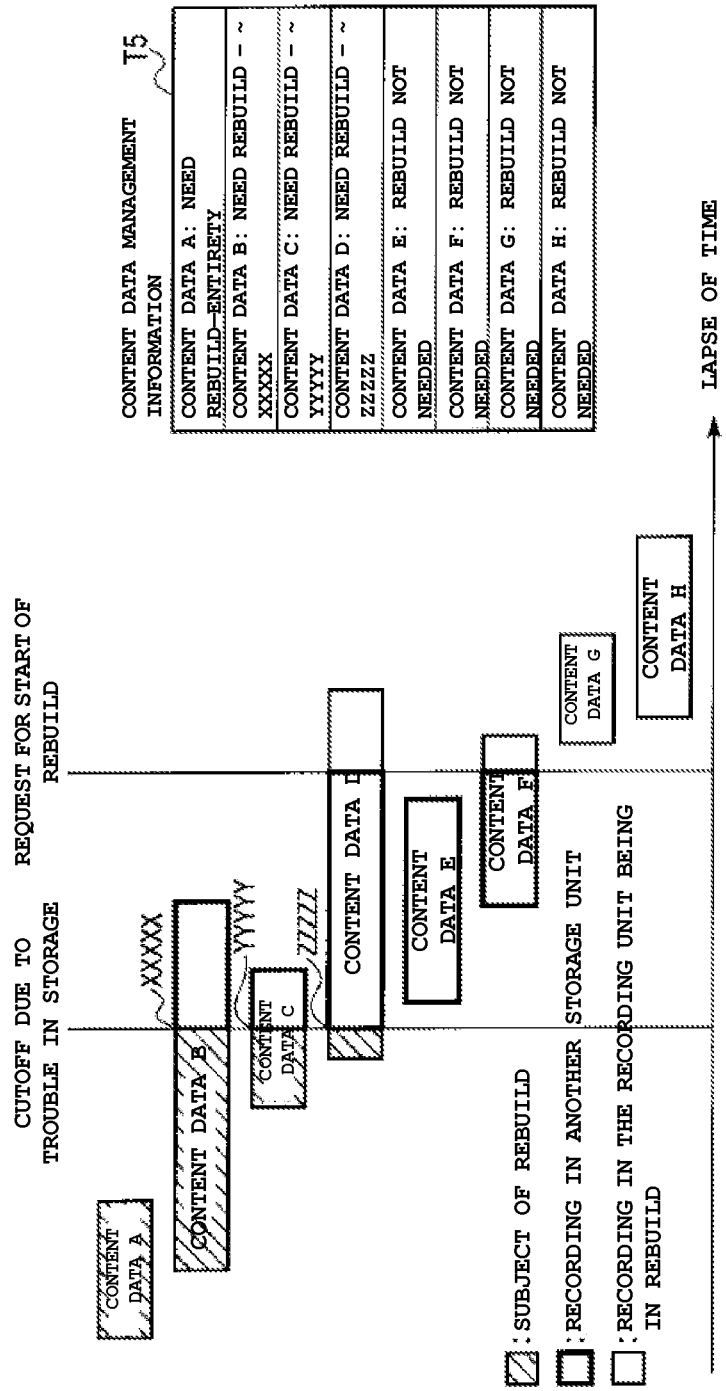
FIG. 11 is a timing diagram illustrating the rebuild control operation in a fifth embodiment.

FIG. 11 is a timing diagram illustrating the rebuild control operation by the storage unit 1131 according to the fifth embodiment.

When a problem takes place in the storage device 234 and the storage device 234 is cut off, the management/control unit 243 of the RAID controller 24 takes the management table T5 of the accumulating unit 246 as a reference, and manages the content data that have been fully recorded to that point in time (content data A) as the content data that need a rebuild. The content data in the process of being recorded (content data B, C, D) are also taken as the content data that need a rebuild processing and the information recorded up to the write locations (XXXXX for content data B, YYYYY for content data C, and ZZZZZ for content data D) in the storages 231-23($n$+ 1) is managed in the management table T5.

In addition, the controller 111 allots the resources from the storage unit 1131 containing the troubled storage device 234 to another storage unit 1132, and carries out associated control for the recording unit 1121 to write the content data to the storage device of another storage unit 1132.

Upon receiving the request for start of rebuild, the management/control unit 243 of the RAID controller 24 writes the content data currently being recorded (content data D, F), the content data that started recording after the rebuild request (content data G, H), and the other content data that needs a rebuild in the storage device 234, as the rebuild subject.

According to the fifth embodiment, it is possible to collect even the content data being recorded after start of rebuild in a single storage unit 1131 by returning the content data for recording in the storages 231-23(n+1) of the storage unit 1131 being rebuilt.

Sixth Embodiment

According to the sixth embodiment, different rebuild control processes are carried out for the various respective storage units 1131-113m according to preset mode information (structural information).

Figure 12:
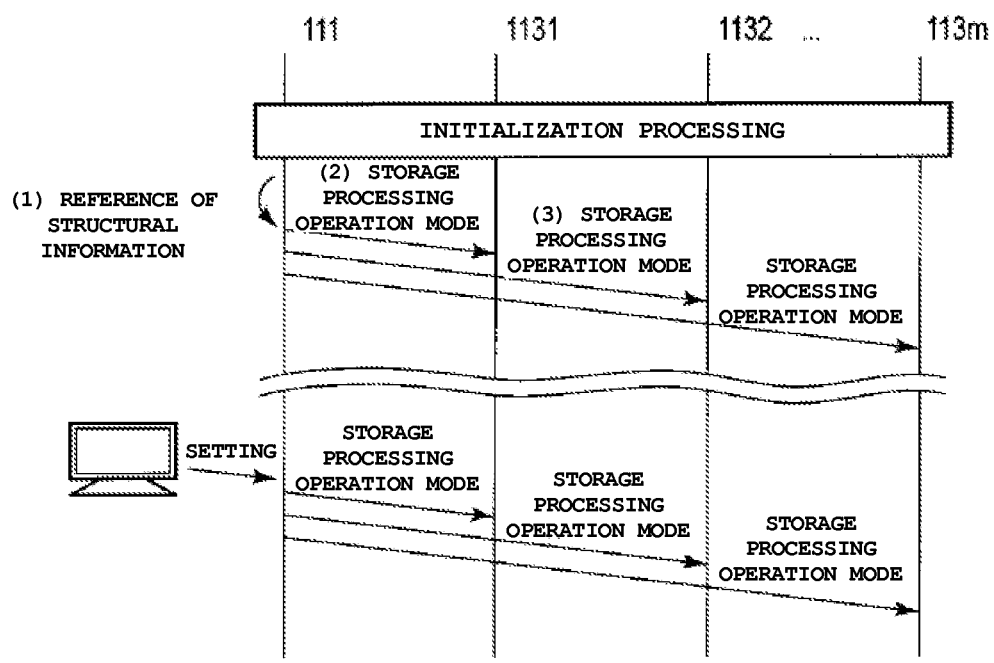
FIG. 12 is a diagram illustrating the sequence of the transmission/reception of signals between the controller and the various storage units.
Figure 13:
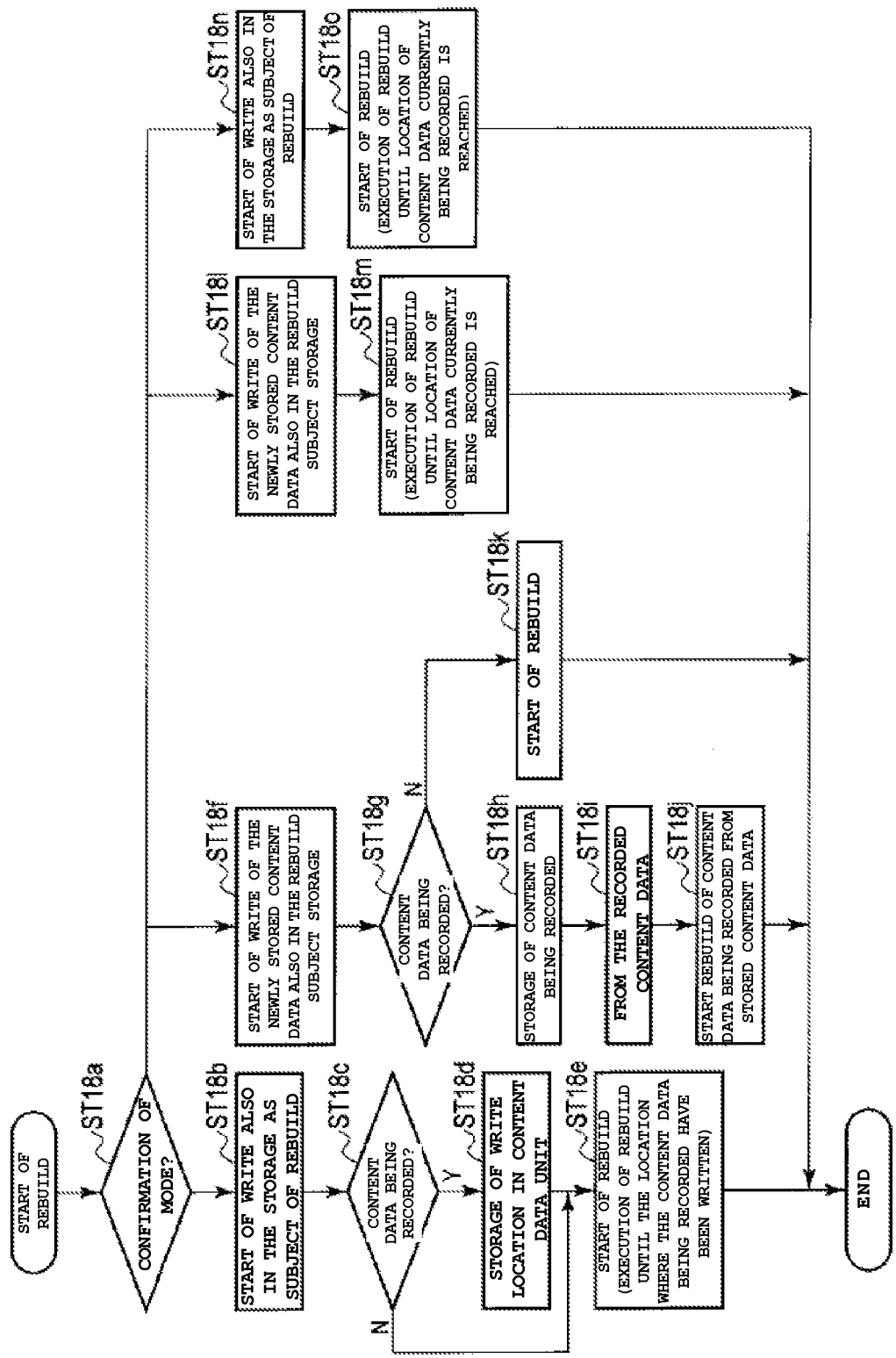
FIG. 13 is a flow chart illustrating the control processing procedure of the controller in a sixth embodiment.

FIG. 12 is a sequence diagram illustrating the transmission/reception operation of signals between the controller 111 and the various storage units 1131-113m according to the sixth embodiment. FIG. 13 is a flow chart illustrating the control processing procedure of the controller 111 in this example.

Since the structural information is preset, when the video server 11 is turned on, the controller 111 reads out the structural information and the rebuild processing operation mode for storage unit 1131 is set based on the structural information, (FIG. 12(1)). The information indicating the set rebuild processing operation mode 1 is sent to the storage unit 1131 (FIG. 12(2)).

Upon receiving the information indicating the rebuild processing operation mode 1 from the controller 111, the storage unit 1131 goes from step ST18a to step ST18b. By reference to the management table T1 of the accumulating unit 246, the content data that have been recorded to that point in time (content data A, B, C, E) are managed as the content data that need the rebuild.

Then, judgment is made on whether there is content data currently being recorded (step ST18c) in the storage unit 1131. If there is such content data (Y), this content data (content D and F, in this example) are also taken as the content data that need a rebuild processing, and the information for the current write locations in the storages 231-23(n+1) (XXXXX for content data D, and YYYYY for content data F) is stored in the management table T1 for management (step ST18d).

Also, the management/control unit 243 of the storage unit 1131 carries out management of the content data that started recording after receiving the request for start of rebuild (content data G, H, in this example) as the content data that do not require rebuild processing. The management/control unit 243 writes the content data G, H in the various storages 231, 233-23(n+1), excluding the troubled storage 232.

Upon receiving the request for start of rebuild, the RAID controller 24 of the storage unit 1131 writes content data in the n+1 storages 231-23(n+1) including the storage 232 as the rebuild processing subject. For the content data that were already recorded and the content data being recorded that need a rebuild too, the content data are written in the storage 232 as the rebuild subject (step ST18e) upon receiving the request for start of rebuild.

Controller 111 sets the rebuild processing operation mode for the storage unit 1132 on the basis of the structural information, and it sends the information indicating the set rebuild processing operation mode 2 to the storage unit 1132 (FIG. 12(3)).

Upon receiving the information indicating the rebuild processing operation mode 2 from the controller 111, the storage unit 1132 goes from step ST18a to step ST18f, and, with the management table T2 of the accumulating unit 246 taken as the reference, it manages the content data that have been already recorded prior to the rebuild start request (content data A, B, C, E) as the content data that need a rebuild.

Then, the RAID controller 34 of the storage unit 1132 determines whether there is content data currently being recorded (step ST18g). If there is such content data (Y), the content data (content data D and F, in this example) are taken as the content data that need a rebuild and are written in the storages 231-23(n+1) (step ST18h). The raid controller 34 carries out the rebuild processing first for the content data that have already been recorded (step ST18i), and then, the rebuild processing is carried out for the content data that was in the process of being recorded at the time of the rebuild request according to the order of completion (first content data F, then D, in the example), such that the first to finish is the first rebuilt regardless of the recording start time (step ST18j).

If there exists no content data currently being recorded in step ST18g (N), the RAID controller 34 of the storage unit 1132 carries out a rebuild processing for all of the content data already recorded (step ST18k).

If, on the basis of the structural information, the controller 111 sets the rebuild processing operation mode for the storage unit 1133 and sends the information indicating the set rebuild processing operation mode 3 to the storage unit 1133, then, upon receiving the information indicating the rebuild processing operation mode 3 from the controller 111, the storage unit 1133 goes from step ST18a to step ST18l, with the management table T3 as reference. When the request for the start of the rebuild is received, the content data which were sent to storage unit for storage in the n+1 storages of the storage unit after the rebuild request was received are included in the rebuild processing (step ST18m).

In addition, on the basis of the structural information, controller 111 sets the rebuild processing operation mode for the storage unit 1134, and it sends the information indicating the set rebuild processing operation mode 4 to the storage unit 1134. Upon receiving the information indicating the rebuild processing operation mode 4 from the controller 111, the storage unit 1134 goes from step ST18a to step ST18n, and it uses the management table T4 as a reference to write the content data in the (n+1) storage devices, including the storage device which was the rebuild processing subject (step ST18o).

By a similar method, the operation mode may be set for the storage units 1131-113m via the controller 111 on the basis of the structural information, and the operation of the rebuild processing may be set.

According to the sixth embodiment, mode setting is carried out for each of the storage units 1131-113m, and it is possible to carry out the optimum rebuild processing in each storage unit so that the rebuild processing is ended quickly for the content data that have been recorded, upon receiving the request for start of rebuild and the content data currently being recorded for a certain storage unit 1131, and the rebuild processing is carried out while the data quality can be held for the content data currently being recorded for another storage unit 1132.

According to the sixth embodiment, corresponding to the instruction from the controller 111 for certain storage unit 1131, the rebuild processing is carried out for the content data that need rebuild, and it is possible to carry out the optimum rebuild processing for each storage unit, so that for another storage unit 1132 (for example), the content data currently being recorded may be recorded and protected in another storage unit 1135 (for example), and for another storage unit 1133 even the content data currently being recorded are subject to rebuild processing and are collected for recording in a single storage unit 1133.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content server having a storage unit that comprises:
   a plurality of storage devices to which content data are to be written;
   a management table generator configured to generate a management table that records storage addresses for the content data and a state of writing the content data at the storage addresses; and
   a control unit configured to access the management table and control a rebuild operation for rebuilding the content data written to the storage devices based on the management table when one of the storage devices becomes damaged or troubled, wherein the control unit initiates the rebuild operation prior to writing all of the content data;
   wherein the control unit references the management table during the rebuild operation to rebuild the content data that are already written to the storage devices and are in the process of being written to the storage devices, but not the content data for which writing has not been initiated.

2. The content server of claim 1, wherein the storage unit s arranged in a redundant array of inexpensive disk (RAID) structure with n+1 storage devices, where n is an integer and represents the number of storage devices needed to store the content data.

3. The content server of claim 1, wherein the storage unit further includes a table accumulation unit in which the management table is stored.

4. The content server of claim 1, wherein the control unit executes the rebuild operation to rebuild portions of the content data that are written to the storage devices after the rebuild operation was initiated.

5. The content server of claim 4, wherein the rebuild operation for the content data having portions that are written to the storage devices after the rebuild operation was initiated is carried out in an order that writes of the corresponding portions have completed.

6. The content server of claim 1, wherein the management table generator and the control unit are components of a redundant array of inexpensive disk (RAID) controller.

7. The content server of claim 1, wherein the control unit includes:
   a parity adding unit for supplying parity data to the content data;
   a write controller for controlling the writing of the content data to the storage devices;
   a read controller for controlling the reading of the content data from the storage devices; and
   a data recovering unit for recovering the content data from the damaged or troubled storage device.

8. A video server for storing content data for broadcasting, comprising:
   a plurality of storage units, each storage unit including a plurality of storage devices for storing the content data at a plurality of storage addresses in a redundant array of inexpensive disks (RAID) system;
   a table generator configured to generate a management table that records an identification of the content data and the storage addresses of the content data; and
   a rebuild processor configured to execute a rebuild process based on the management table to read out the content data stored in the storage devices other than a damaged or troubled storage device and write the content data that are read out to the storage devices so as to recover the content data stored in the damaged or troubled storage device, wherein the rebuild process is carried out on a portion of the content data written to the damaged or troubled storage device before the rebuild process has been initiated, wherein the rebuild process is carried out on the content data that was in the process of being written at the time the rebuild process is initiated.

9. The video server according to claim 8, wherein the rebuild process for the content data that was in the process of being written at the time the rebuild process is initiated, is carried out in an order that writing thereof has completed.

10. The video server according to claim 8, further comprising a rebuild controller having different operating modes including a first mode in which the rebuild process is carried out such that the content data written before a start of the rebuild process and the content data being written at a time of the start of the rebuild process are rebuilt up to a point of the start of the rebuild process and a second mode in which the content data being written at the time of the start of the rebuild process is rebuilt in an order that writing thereof has completed.

11. The video server according to claim 10, wherein the rebuild controller further comprises a mode selecting controller that selectively executes the first mode or the second mode based on a preset mode setting or a selection by a user.

12. The video server according to claim 8, further comprising a rebuild controller having different operating modes including:
   a first mode in which the content data which needs to be written after a start of the rebuild process are written in the storage unit undergoing rebuilding;
   a second mode in which the content data which needs to be written to the plurality of storage units after the start of the rebuild process are returned for writing in the storage unit undergoing rebuilding; and
   a third mode in which the content data written since the start of the rebuild process are returned for writing in the storage unit undergoing rebuilding.

13. A method of controlling a rebuild process in a video server storing video data for broadcasting, the video server having a plurality of storage units, each storage unit having a plurality of storage devices, the method comprising:
   generating a management table when video data is stored in a storage unit, the management table specifying at least an address for each video data stored in the storage unit;
   reading out video data stored in undamaged or untroubled storage devices of the storage unit having at least one damaged or troubled storage device; and performing a rebuild process on video data stored in the at least one damaged or troubled storage device by using information in the management table and the video data read out from the undamaged or untroubled storage devices, wherein the rebuild process is started while video data is being written to the storage unit.

14. The method of claim 13, wherein video data being written to the storage unit when the rebuild process is started are processed according to an order of writing completion.

* * * * *